Dec. 18, 1956     A. P. RATCLIFFE     2,774,610
FENDER FOR TRACTORS
Filed Oct. 1, 1954
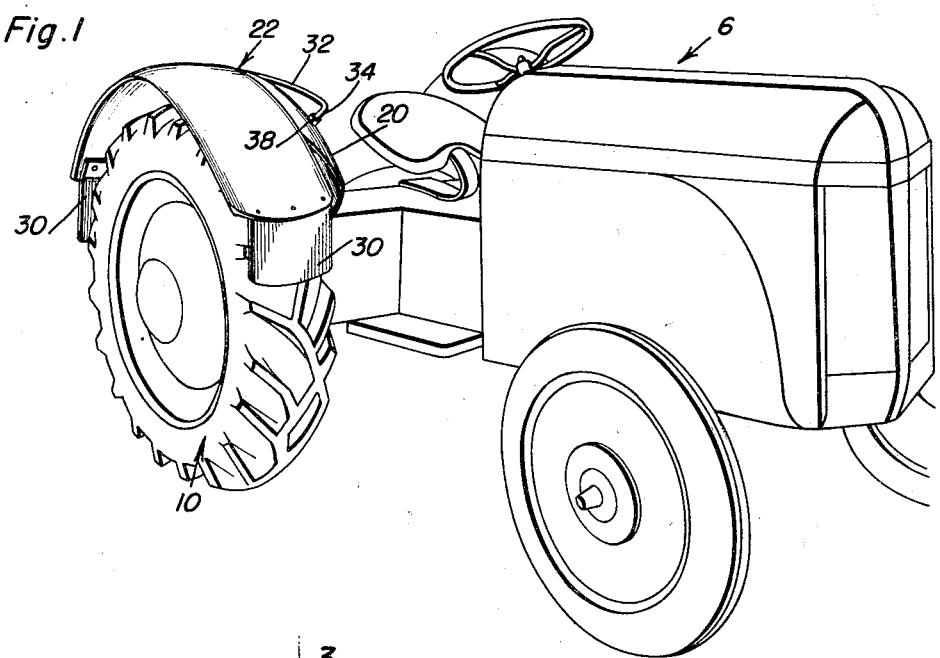
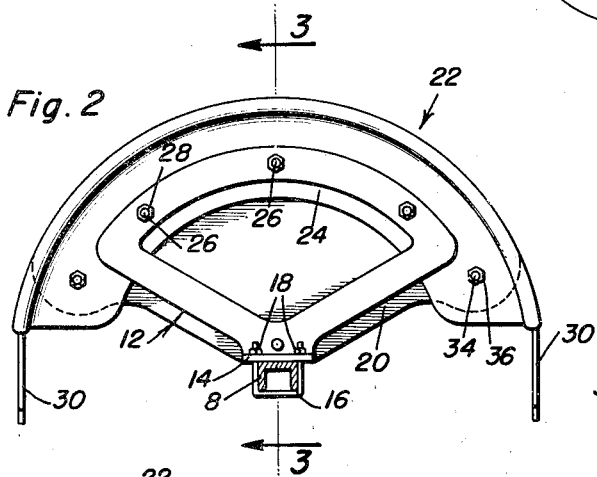
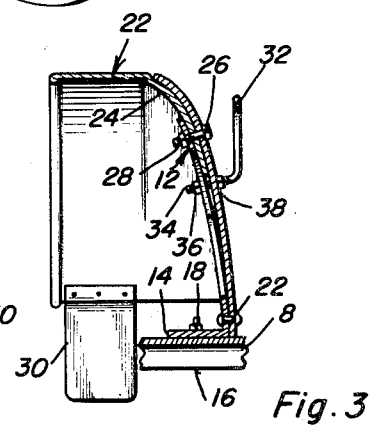
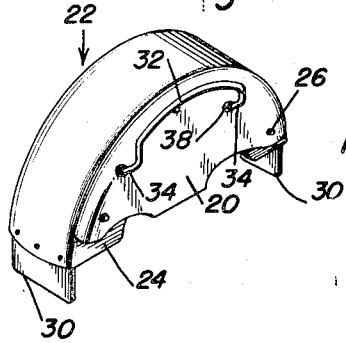
Auburn P. Ratcliffe
INVENTOR.

United States Patent Office 2,774,610
Patented Dec. 18, 1956

2,774,610

FENDER FOR TRACTORS

Auburn P. Ratcliffe, Radford, Va.

Application October 1, 1954, Serial No. 459,712

3 Claims. (Cl. 280—152)

The present invention relates to an improved fender which has been expressly designed for use on a conventional type tractor and which cooperates with a suitable areal portion of the tread of the cooperating traction tire and therefore constitutes a satisfactory mud guard.

It is a matter of common knowledge among those who are familiar with tractor constructions and the use thereof in the field that there are a number of tractors on the market and in use wherein so-called safety guards are provided. These guards are usually in the form of sector-shaped plates and they are located so that they extend vertically above the wheel supported axle and while they function as effectual shields they do not constitute satisfactory protectors against mud and flying debris. It has been found, however, that these safety guards and means for supporting the same provide a satisfactory place for attachment of needed fenders with end flaps and which constitute reliable and efficient mud guards. It is therefore one object of the invention to provide a fender for the upper tread portion of each tire or wheel as will be hereinafter clarified.

Another object of the invention has to do with the addition to the stated assemblage, the safety guard and fender, of a suitably constructed and arranged hand rail, one which is in a handy position and which may be relied upon to give aid and comfort to the driver of the tractor whenever it is felt that the rough-going necessitates the use of such a handle.

Briefly summarized, the invention therefore has to do with a wheel supported axle, safety guard mounted on said axle and opposed to and cooperating with a portion of an adjacent supporting wheel, a fender cooperating with a tread portion of the wheel, the fenders being separably mounted on the guard and using the guard as a support therefor, and there being a hand rail which is also mounted in the guard, the hand rail being so arranged and constructed that it includes screw-threaded end portions which pass through the cooperating edge portions of the guard and fender respectively and which, provided with assembling and retaining nuts, not only serves to anchor the hand rail in place but assists in bolting the guard and fender together.

Other objects, features and advantages will become more readily apparent from the following description and the accompanying sheet of illustrative drawings.

In the drawings, wherein like numerals are employed to designate like parts throughout the same:

Figure 1 is a perspective view of a conventional type tractor showing the invention and the manner in which it is constructed and used;

Figure 2 is an elevational view showing the complemental parts of greater particularity;

Figure 3 is a section on the vertical line 3—3 of Figure 2 looking in the direction of the arrows; and Figure 4 is a perspective view on a small scale of the over-all combination.

With reference to Figure 1 the tractor is denoted generally by the numeral 6. As brought out in Figure 2 the axle is denoted at 8. The traction wheel 10 is mounted on the axle. It is not necessary to go into detail regarding the construction of the wheel, axle and other parts since the invention has to do with merely the parts which are attached to and supported from the axle and which associates themselves with the tread portion of the wheel. With reference, therefore, to Figure 2 the numeral 12 designates a substanntially triangular adapter frame. This has a lateral flange 14 at its vertex portion which is secured by a clevis 16 which embraces the axle and is held by the assembling and retaining nut 18. This is a part of the aformentioned safety guard. The guard itself comprises a segmental or sector-shaped substantially imperforate plate of the approximate shape shown in Figure 4 and this is denoted by the numeral 20. This is superimposed against the adaptor bracket or frame and is customarily secured thereto by rivets or the like, one of which is shown at 22 in Figure 3.

In keeping with the present invention the rivets which secure (not shown) the major or body portion of the guard to the frame or bracket are knocked out or in some suitable manner removed so that the holes which accommodated the rivets to start with are substantially intact. This is so that when the added fender is brought into play, the frame or bracket and safety guard constitute means for supporting the same, reference is had, for example, to Figure 3 wherein it will be seen that 22 denotes an arcuate fender provided on what may be called the inner side with a skirt-like flange 24. This flange is shaped up and so made that it fits nicely between the frame 12 and guard 20. That is to say that it is sandwiched in place between these parts. It has bolt holes in registry with the holes in the existing or stock parts 12 and 20. Fitted into these holes are bolts 26 having retaining nuts 28 and by thus bolting the several parts together it will be seen that they lend cooperative association with one another. The numerals 30 denote appropriate flaps which are secured to the ends of the fender in any appropriate manner.

The fact that the fender makes it difficult for the guard 20 to be used in any manner as a handle or hand-grip for temporary support, in case it is needed, it is thought advisable to here include a special handle. This comprises what may be called an arcuate or longitudinally disposed hand rail 32. It is supported in a handy and convenient place on the assemblage shown. More specifically, the laterally directed ends 34 are screw threaded. They are passed through holes provided therefor in the cooperating guard and flange 24 much in the manner brought out in Figure 4. By employing inside and outside assembling and retaining nuts 36 and 38 the several parts are thus assembled and secured one to the other.

It is submitted that by providing safety guards or shields equipped with reliable and accessible hand rails and adding thereto fenders, these several protective complements will serve the requirements of manufacturers and needs of users.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a tractor, in combination, a wheel-supported axle an adapter frame removably bolted on said axle adjacent to said wheel, a sector-shaped plate constituting a safety guard and opposed to said frame, a wheel fender cooperating with a tread portion of said wheel and having a flange interposed between said frame and guard, and nut-equipped bolts passing through cooperating portions of said frame, guard, and flange.

2. In a tractor, in combination, a wheel-supported axle, an adapter frame removably bolted on said axle adjacent to said wheel, a sector-shaped plate constituting a safety guard and opposed to said frame, a wheel fender cooperating with a tread portion of said wheel and having a flange interposed between said frame and guard, and nut-equipped bolts passing through cooperating portions of said frame, guard, and flange, a hand rail having lateral screw-threaded end portions passing through cooperating portions of said guard, flange and frame and provided with assembling and retaining nuts.

3. In a tractor, in combination, an adapter frame adapted to be removably bolted on the wheel supported axle of the tractor adjacent said wheel, a sector-shaped plate constituting a safety guard and opposed to said frame, a wheel fender cooperating with a tread portion of said wheel and having a flange interposed between said frame and guard, and nut-equipped bolts passing through cooperating portions of said frame, guard, and flange, a hand rail having lateral screw-threaded end portions passing through cooperating portions of said guard, flange and frame and provided with assembling and retaining nuts.

References Cited in the file of this patent

UNITED STATES PATENTS

| 746,192 | Stone | Dec. 8, 1903 |
| 1,488,136 | Simpson | Mar. 25, 1924 |
| 1,498,268 | Harris | June 17, 1924 |
| 2,052,732 | Tjaarda | Sept. 1, 1936 |
| 2,238,305 | Branch | Apr. 15, 1941 |